(12) United States Patent
Pearson (10) Patent No.: US 10,938,945 B2
(45) Date of Patent: Mar. 2, 2021

(54) SYSTEMS AND METHODS FOR CONTROLLING ACCESS TO USER CONTENT

(71) Applicant: D2L CORPORATION, Kitchener (CA)

(72) Inventor: Brian Pearson, Waterloo (CA)

(73) Assignee: D2L CORPORATION, Kitchener (CA)

( * ) Notice: Subject to any disclaimer, the term of this patent is extended or adjusted under 35 U.S.C. 154(b) by 0 days.

(21) Appl. No.: 13/832,683

(22) Filed: Mar. 15, 2013

(65) Prior Publication Data

US 2014/0280935 A1    Sep. 18, 2014

(51) Int. Cl.
*H04L 29/08* (2006.01)
*H04L 29/06* (2006.01)

(52) U.S. Cl.
CPC .......... *H04L 67/306* (2013.01); *H04L 63/102* (2013.01); *H04L 63/105* (2013.01); *H04L 67/36* (2013.01)

(58) Field of Classification Search
CPC .................................................. H04L 67/306
USPC ........................................... 709/225; 705/53
See application file for complete search history.

(56) References Cited

U.S. PATENT DOCUMENTS

| | | | | |
|---|---|---|---|---|
| 8,620,956 B2* | 12/2013 | Wang et al. | | 707/791 |
| 2003/0221012 A1* | 11/2003 | Herrmann | | G06F 9/5011 709/229 |
| 2004/0153508 A1* | 8/2004 | Alcorn | | G06Q 30/06 709/205 |
| 2006/0259351 A1* | 11/2006 | Yaskin | | G06Q 10/06 705/7.38 |
| 2007/0156693 A1* | 7/2007 | Soin et al. | | 707/9 |
| 2007/0255805 A1* | 11/2007 | Beams et al. | | 709/218 |
| 2008/0138788 A1* | 6/2008 | Allen | | G09B 7/08 434/365 |
| 2008/0318197 A1* | 12/2008 | Dion | | G09B 7/00 434/322 |
| 2009/0197234 A1* | 8/2009 | Creamer et al. | | 434/350 |
| 2009/0291426 A1* | 11/2009 | Polivka | | 434/350 |
| 2010/0162365 A1* | 6/2010 | Del Real | | 726/4 |
| 2011/0029435 A1* | 2/2011 | Ronen et al. | | 705/53 |
| 2012/0231438 A1* | 9/2012 | Fakhrai | | G09B 7/00 434/350 |
| 2013/0085955 A1* | 4/2013 | Dugas | | 705/326 |
| 2014/0122587 A1* | 5/2014 | Petker | | G09B 5/08 709/204 |
| 2014/0344252 A1* | 11/2014 | Kapoor | | G09B 7/02 707/722 |

* cited by examiner

*Primary Examiner* — Nicholas R Taylor
*Assistant Examiner* — Sanjoy Roy
(74) *Attorney, Agent, or Firm* — Gowling WLG (Canada) LLP; Neil W. Henderson (57) ABSTRACT

The disclosure is directed at a method and system for controlling access to user content within a search framework. After a user accesses the search framework, the user's role within the framework is verified and then user content over the entire search framework which is associated with the user's role is retrieved and displayed to the user.

20 Claims, 6 Drawing Sheets

SYSTEMS AND METHODS FOR CONTROLLING ACCESS TO USER CONTENT

FIELD

The present disclosure relates generally to user content retrieval. More particularly, the present disclosure relates to systems and methods for controlling access to user content.

BACKGROUND

In the digital technology age, the storage of information, or user content, has improved. Of course, the storage of information usually results in this information being accessed by various users or individuals at some point.

For instance, in a teaching environment or teaching environment system, the information or user content (such as quizzes, class notes, marks, and/or reading lists) is stored within one or multiple databases. In order to access this user content, users typically have to log into the system and then make a request to retrieve the user content.

In some current teaching environments, the retrieval of user content is on a piece-by-piece basis and therefore, in order to obtain the last three quizzes in a course, the user has to perform three separate requests. This can be time consuming and will become even more so if the user mis-enters a search term or misspells a word.

Also, in other current teaching environments, even if user may retrieve all quizzes at one time, the user may only access or retrieve one type of user content per search. In other words, if the user wanted to access or retrieve a quiz and corresponding marking guide (assuming that the quiz and marking guide were different object types), the user would have to perform at least two searches to obtain both types of user content.

In other scenarios, some of the information which is stored may be restricted from access by certain individuals.

Therefore, there is provided at least one novel method and system for controlling access to user content.

The above information is presented as background information only to assist with an understanding of the present disclosure. Not determination has been made, and no assertion is made, as to whether any of the above might be applicable as prior art with regard to the present disclosure.

SUMMARY

It is an object of the present disclosure to obviate or mitigate at least one disadvantage of previous methods and systems for retrieving user content in a teaching environment.

In one aspect of the disclosure, there is provided a method of controlling access to user content in a search framework including receiving login information from a user; determining authorization level of the user; and determining viewable user content over the entire search framework based on the authorization level of the user.

In another aspect, the method further includes transmitting user content associated with the authorization level of the user to the user.

In yet a further aspect, determining viewable user content includes retrieving all user content from a database; and selecting viewable user content from all user content.

In another alternative aspect, selecting viewable user content includes comparing the authorization level of user with individual settings of user content; and selecting the user content which matches the authentication level of the user as viewable user content.

A further aspect of the disclosure includes selecting user content from a database which matches predetermined criteria.

In another aspect, the predetermined criteria is selected from a group consisting of data restrictions, pre-requisites met and hidden user content.

In yet another aspect, determining viewable user content includes comparing authorization level of user with individual settings of all user content in a database; selecting the user content which matches the authentication level of the user; and retrieving the selected user content as viewable user content.

Another aspect of the disclosure includes comparing the user with a list of user names and roles; determining permission of role associated with the user; and determining authorization level of user based on permission of role.

In another aspect, the roles are selected from professor, teaching assistant, teacher, dean, or administrator.

In yet a further aspect, there is provided a system for controlling access to user content for display to a user in a search framework comprising a database for storing user content, the user content relating to the search framework; and a processor for retrieving viewable user content over the entire search framework from the database based on an authorization level of the user.

In another aspect, the system of has a permissions database for storing a list of user names and associated roles within the search framework.

In a further aspect, the roles include professor, teaching assistant, teacher, dean, or administrator.

In another aspect, the permissions database is the same as the database for storing user content.

In yet another aspect, the system includes a display for displaying viewable user content to the user.

In yet a further aspect, there is provided a computer program product including computer readable memory storing computer executable instructions thereon that when executed by a computer to receive login information from a user; determine authorization level of the user; and determine viewable user content based on the authorization level of the use.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for controlling access to user content within a search framework.

In a preferred embodiment, the search framework is part of a teaching environment, however, the method and system may be used in any environment in which access to information is to be controlled. In an embodiment, after a user accesses the search framework, the user's role within the framework is verified and then user content which is associated with the user's role is retrieved and displayed to the user. Rather than requiring a user to request user content one piece at a time, in an embodiment, the system allows for multiple pieces or user content or information to be displayed to a user with a single request.

In a further example of a teaching environment search framework, after a user successfully logs into the search framework, a processor verifies the role which the user has within the teaching environment search framework, such as, but not limited to, professor, teaching assistant, student, dean, administrator, or the like. Within the different parts of the search framework may be different courses, departments, different lab groups, and the like. The user content available for display may differ from user to user, depending on the role of the logged in user.

After determining the role of the logged in user, the processor retrieves user content that the user is authorized to view with respect to the entire search framework or to individual courses, departments, or the like, and then transmits this user content for display to the user such as in the form of a listing of available user content to be reviewed. For example, the processor may retrieve all user content that the user is authorized to view and thereafter transmits the retrieved user content for display.

The determination of what user content the user is able to view may include criteria such as date restriction, role restriction, task restriction and many other types or criteria, individually or in combination with each other.

Figure 1:
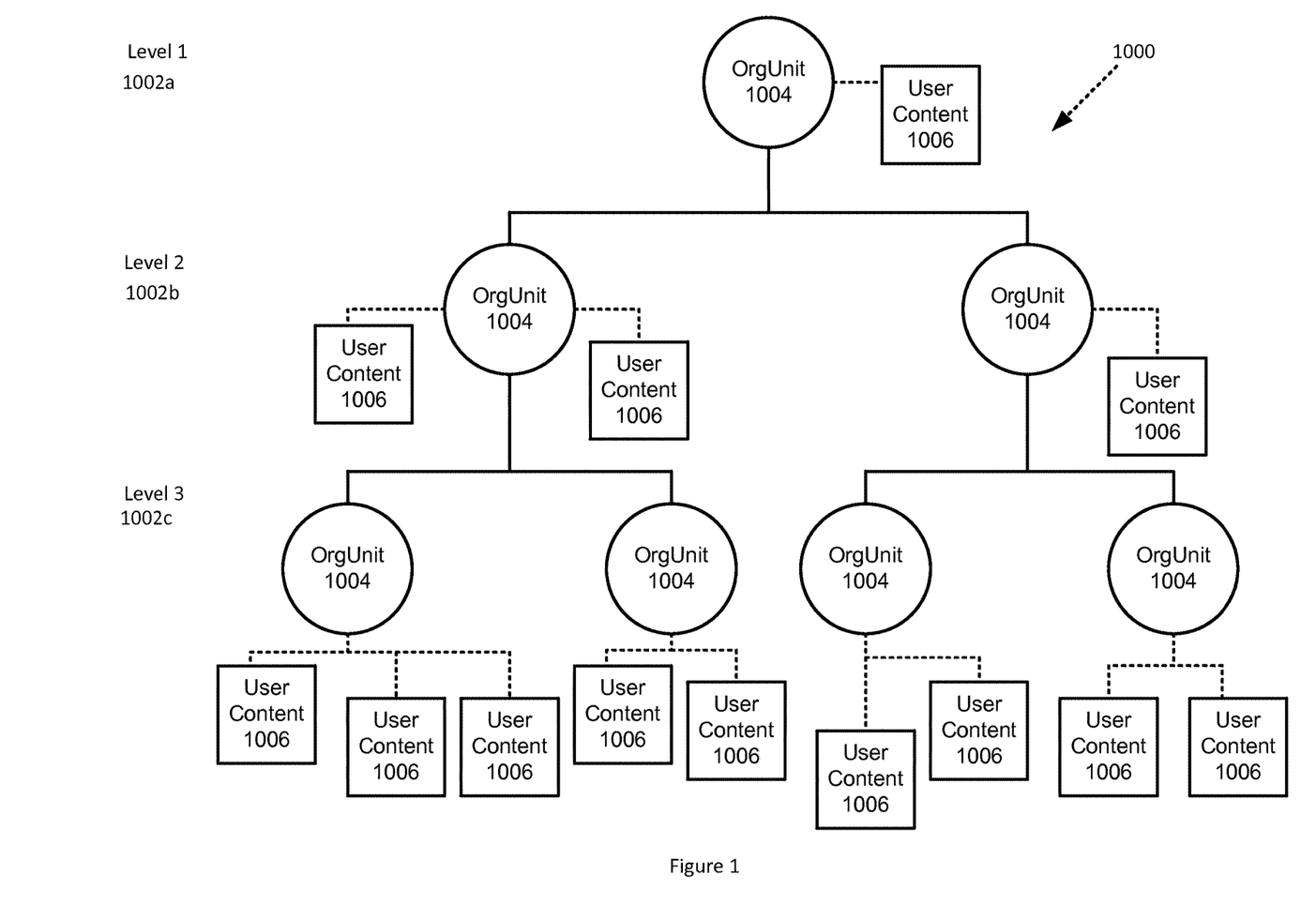
FIG. 1 is a schematic diagram of a search framework.

Turning to FIG. 1, a schematic diagram of a search framework is shown. The search framework 1000 includes a plurality of levels 1002 (e.g., 1002a, 1002b, and 1002c) with each level including different parts 1004, which may be seen as OrgUnits. At each level, there may be any number of different parts 1004, however, in the current embodiment, a hierarchical structure is provided which includes one OrgUnit in a first level 1002a, two OrgUnits in a second level 1002b and four OrgUnits in a third level 1002c. Associated with each of the OrgUnits is user content 1006 which may include any information that relates to the OrgUnit. Each of the individual OrgUnits 1004 is associated with a set of user content 1006 which may be seen as an object which is related in some way with the OrgUnit. This will be described in more detail below with respect to FIG. 2.

When a user logs into the search framework 1000 to retrieve user content 1006, the user's role within the search framework 1000 is determined and the user content available to or that may be accessed by the user (based on the user's respective defined role) over the entire search framework is then retrieved and transmitted to the user to be displayed. In this manner, the user does not have to perform a request for each piece of user content that the user wishes to retrieve but may select from a list of available user content with a single request.

Figure 2:
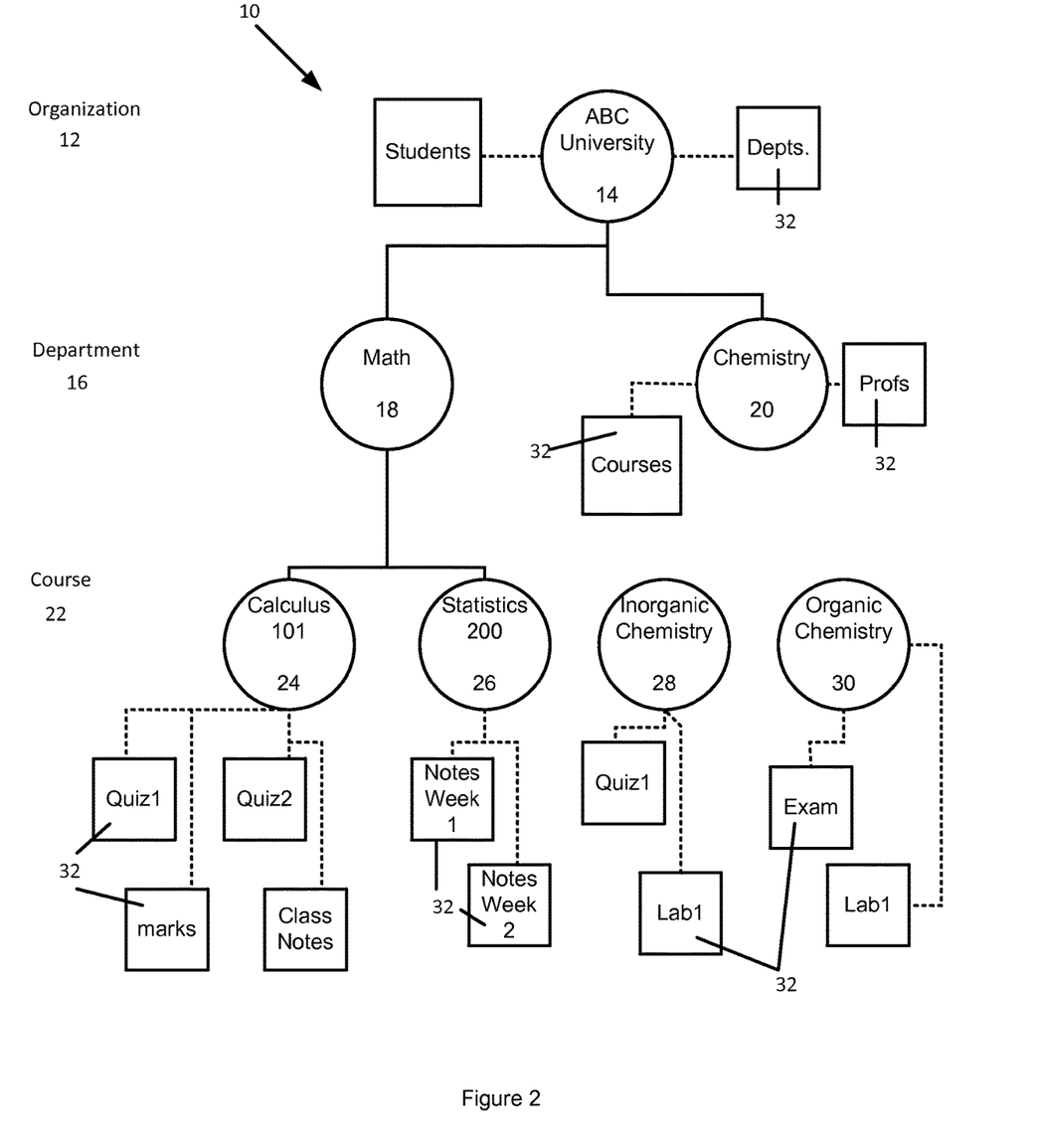
FIG. 2 is a schematic diagram of a search framework for a teaching environment.

Turning to FIG. 2, a schematic diagram of a search framework for use in a teaching environment, or a teaching environment search framework, is shown. The teaching environment search framework 10 is a schematic structure of a hierarchy which may provide a structure for different levels of the teaching environment. Each circle within the search framework may be seen as one of the OrgUnits as discussed above with respect to FIG. 1. For instance, in the example of FIG. 2, the levels of the teaching environment include an organization level 12 including a University 14, a Department level 16 including a Math department 18 and a Chemistry department 20 and a Course level 22 including a Calculus 101 course 24, a Statistics 200 course 26, an Inorganic Chemistry course 28 and an Organic Chemistry course 30. The overall search framework may be seen as a tree. In another embodiment, within a single search framework may be multiple organizations, or trees, however, only one is shown for simplicity in FIG. 2.

As shown in FIG. 2, the Math department 18 and the Chemistry department 20 on the department level 16 are associated with the University 14 while the Calculus 101 course 24 and Statistics 200 course 26 on the Course level 22 are associated with the Math department 18 and the Inorganic Chemistry course 28 and the Organic Chemistry course 30 are associated with the Chemistry department 20. Although not shown, there may also be other departments and associated courses and there is no limit to the size of the search framework.

Associated with each of the OrgUnits of the teaching environment search framework are individual pieces of user content 32, which may be retrieved by individuals, or users, accessing or logging into the teaching environment search framework 10. The relationship between a piece of user content 32 and an OrgUnit is reflected by the dotted line. Each user who has access to the teaching environment search framework typically has an assigned role within the search framework such as, but not limited to, professor, dean, teaching assistant, student or administrator. With respect to user content, examples include, but are not limited to, test, quizzes, class notes, exams, prior exams, professor rating forms or class marks. In some embodiments of the teaching environment search framework, various user content may not be viewable or retrievable by all users and may be only available to those who have authorized access or may be restricted to specific roles within the search framework.

For instance, students may not be able to review class marks or professors may not be able to access professor rating forms. The determination of whether a user is authorized to access certain user content is preferably based on the user's role within the search framework and may be combined with respect to the user content that they are wishing to access. The authorization to access specific user content may also be controlled by criteria such as, but not limited to, date restrictions, object or user content hierarchies or based on pre-requisites being met by the user. Object or user content hierarchies are used so that if a user does not have access to a specific object or user content, the user must not have access to any of the object or user content's descendents. For instance, if a user has not completed the week 3 assignment, the user may not proceed to the week 4 assignment.

For instance, with date restrictions, a user having a role of student may not be able to access user content such as a quiz until a specific date. With respect to pre-requisites, a user having a role of student may not be able to access a quiz until the user has completed a pre-quiz or shown mastery of a topic by doing certain assignments (preferably online) to indicate (prove) that the student is ready for the quiz.

Figure 3:
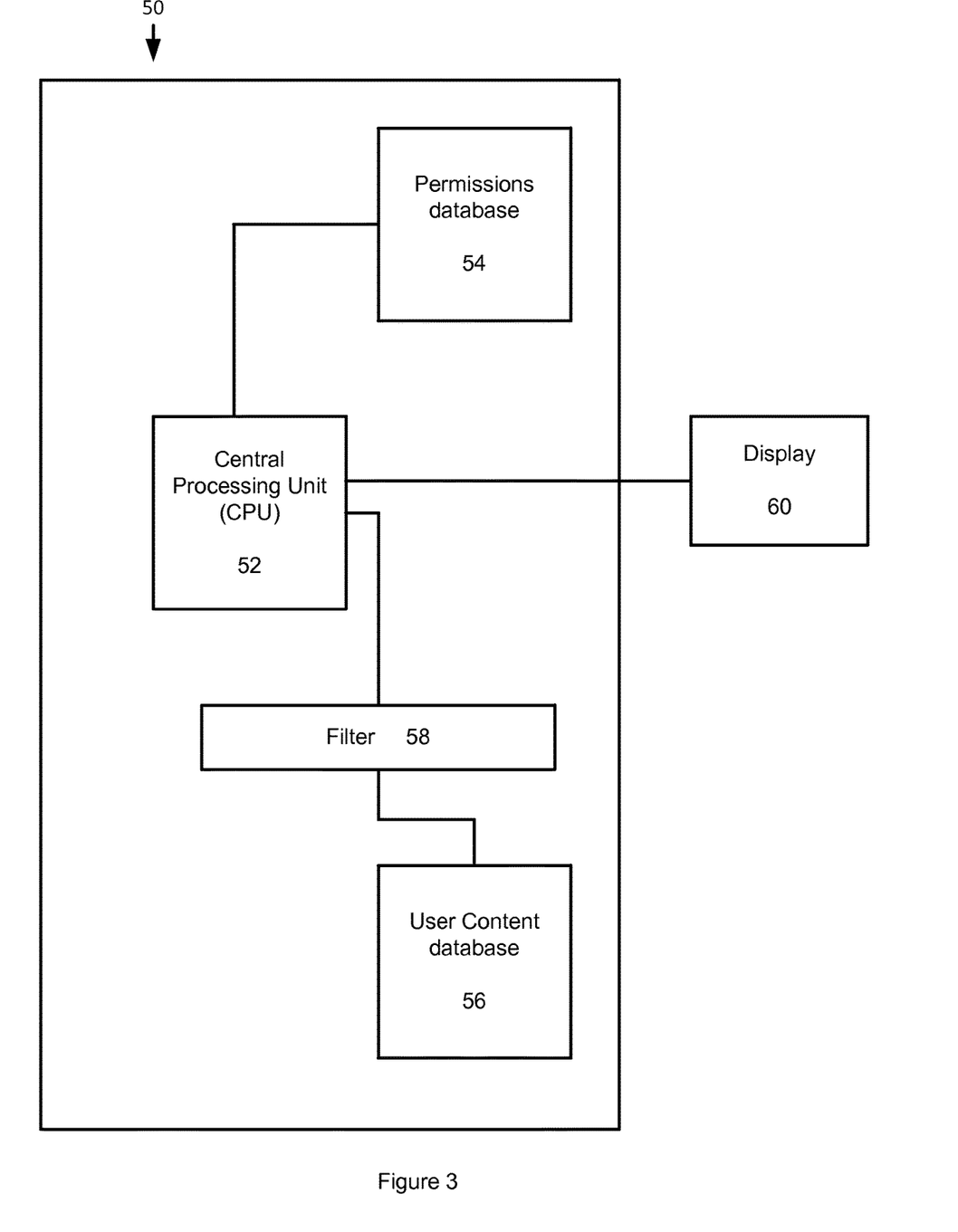
FIG. 3 is a schematic diagram of a system for retrieving user content in a teaching environment.

Turning to FIG. 3, a schematic diagram of a system for controlling access to user content in a search framework, such as a teaching environment search framework is shown. The system 50 includes a Central Processing Unit (CPU) 52 such as a processor which is connected to a permissions database 54 and to a user content database 56 via a filter 58. In one embodiment, the user content database 56 stores all user content for the entire search framework. However, multiple databases may also be used to store all user content for the entire search framework. The system 50 is also connected to a display 60 for displaying retrieved user content to a user which is transmitted by the system 50.

Figure 4:
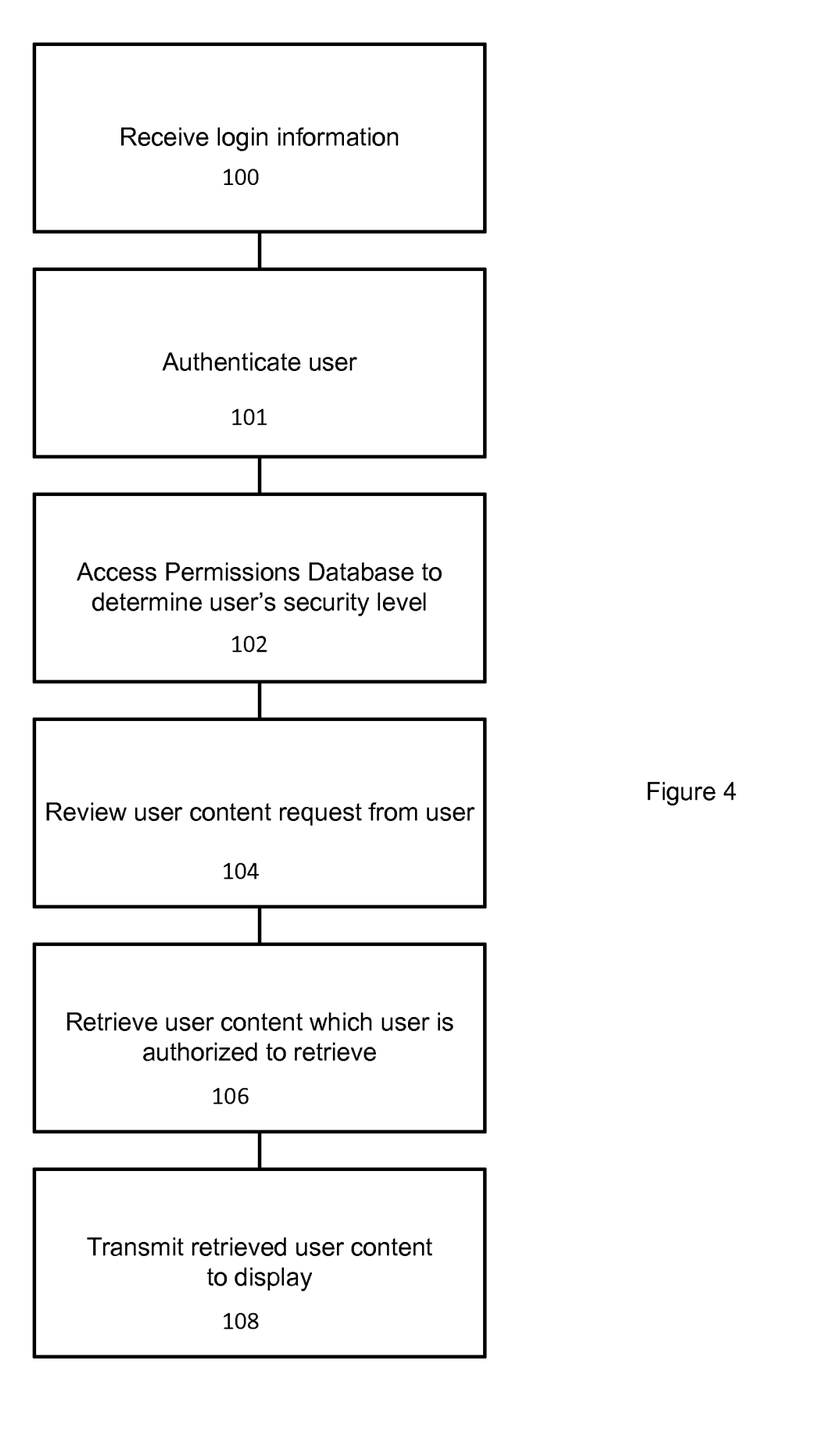
FIG. 4 is a flowchart outlining a first method of retrieving user content in a teaching environment.

In operation, as outlined in a first embodiment in FIG. 4 which shows a method of controlling access to user content in a search framework, a user logs into the search framework to access user content to which the user is authorized, or entitled, to view. The CPU 52 receives the login information in step 100 and then authenticates the user in step 101. For example, the CPU 52 authenticates the user by determining that the user is authorized to access the system. If the user is not authorized to access the search framework, the user is not authenticated and the process ended. Once the user is authenticated, the CPU 52 accesses the permissions database 54 to determine the security level of the user in step 102. As an example, the CPU may determine the security level of the user by determining the role of the user within the search framework. In one embodiment, the determination is based on comparing the user's login information to a listing or table, associating user login information with role information, within the permissions database 54. As discussed above, roles include, but are not limited to, professor, dean, teaching assistant, student or administrator. The determination of the user's role results in a determination of the user's security level or, in other words, the level of access the user may have to the user content stored in the user content database 56.

After determining the user's role in step 102, the CPU 52 reviews the user content request in step 104. For example, the CPU 52 reviews the user content request from the user to determine the user content that the user wishes to retrieve. For instance, in the context of a teaching environment search framework, the user may wish to see the information relating to a course, such as the Calculus 101 course, or the user may wish to see all the user content relating to a department, such as the Math department. The determination of the user content which the user is authorized to retrieve may be based on a single, or multiple, criteria. For instance, the user content may be restricted from a user's view based on date restrictions. In other words, the user content may be associated with a start date and/or an end date for which it may be retrieved by a user. As an example, the user may wish to retrieve all user content relating to quizzes in a course, however, one quiz may only be retrieved by a user on the weekdays of a given week. In another example, the authorization may be associated with a user's role or in other words, the user content may be marked as hidden (e.g., inaccessible) for specific users or roles. For example, according to a configuration of a user content (e.g., a marking scheme for a learning object such as a test), it may be desirable to restrict access to the user content by a student (e.g., a student should not have access to user content). However, a teaching assistant or a professor may be authorized to view that user content (e.g., the marking scheme for the learning object). Another authorization criteria may be based on a conditional release. In other words, the user content may be associated with a set of release conditions and if those conditions are not met by a user, the user content will not be displayed to that user. For example, a release condition may be a requirement that the user receives 50% or higher on a specific quiz before the user is able to view the requested user content. When the user logs in, the CPU can determine whether certain release conditions have been previously met before determining which user content the user is authorized to view. The number of release conditions associated with releasing content to the user (e.g., associated with authorizing the user to view) may be variable. For example, the release conditions may be configured by an administrator (e.g., a course administrator, a professor, a teaching assistant, and the like). Each piece of user content, or object, may have an arbitrary number of release conditions that need to be satisfied. The determination of the user content to be retrieved may be assisted by the filter 58.

The determination criteria may also be a combination of different authorization requirements. In other words, along with the date restriction condition, the user's role may also form part of the authorization determination criteria. For instance, if the user content is a quiz and a date restriction is applied to the user content whereby the user content should not be viewed before a specific date, if the user is a student, the user may be denied access until that specific date. However, if the user is a professor, the date restriction may be deemed to not apply and therefore the professor may review the quiz at any time.

After determining the user content that may be retrieved by the user, the CPU 52 retrieves the user content relating to the request in step 106. Thereafter, the CPU 52 transmits the user content to the display for the user to view in step 108.

Figure 5:
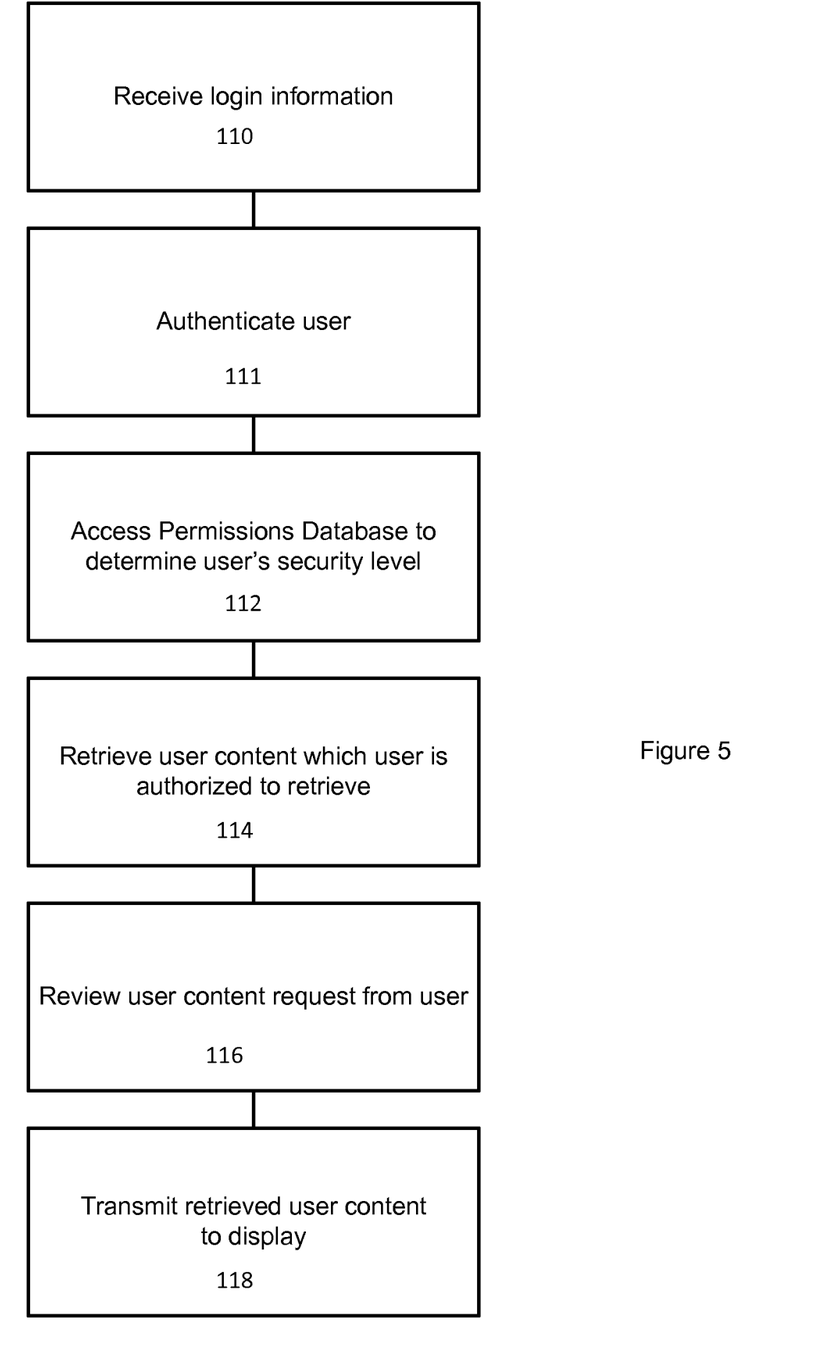
FIG. 5 is a flowchart outlining a second method of retrieving user content in a teaching environment.

Turning to FIG. 5, another method of controlling access to user content within a search framework is shown. The CPU 52 operatively receives login information in step 110. After receiving the login information in step 110, the user is authenticated by the CPU 52 in step 111. For example, the CPU 52 authenticates the user to confirm that the user is authorized to access the user content of the search framework, or the search framework itself. After being authenticated, the security level of the user is determined in step 112. The CPU 52 then retrieves information or user content that the user is authorized to view from the user content database in step 114. For example, the CPU 52 retrieves all information or user content that the user is authorized to view from the user content database. The CPU 52 then reviews the user content request in step 116. For example, the CPU 52 reviews the user content request from the user to remove the user content that the user has not requested or is not authorized to retrieve and collects the remaining user content for the user. In step 118, this remaining user content is then transmitted to the display for the user to view.

Figure 6:
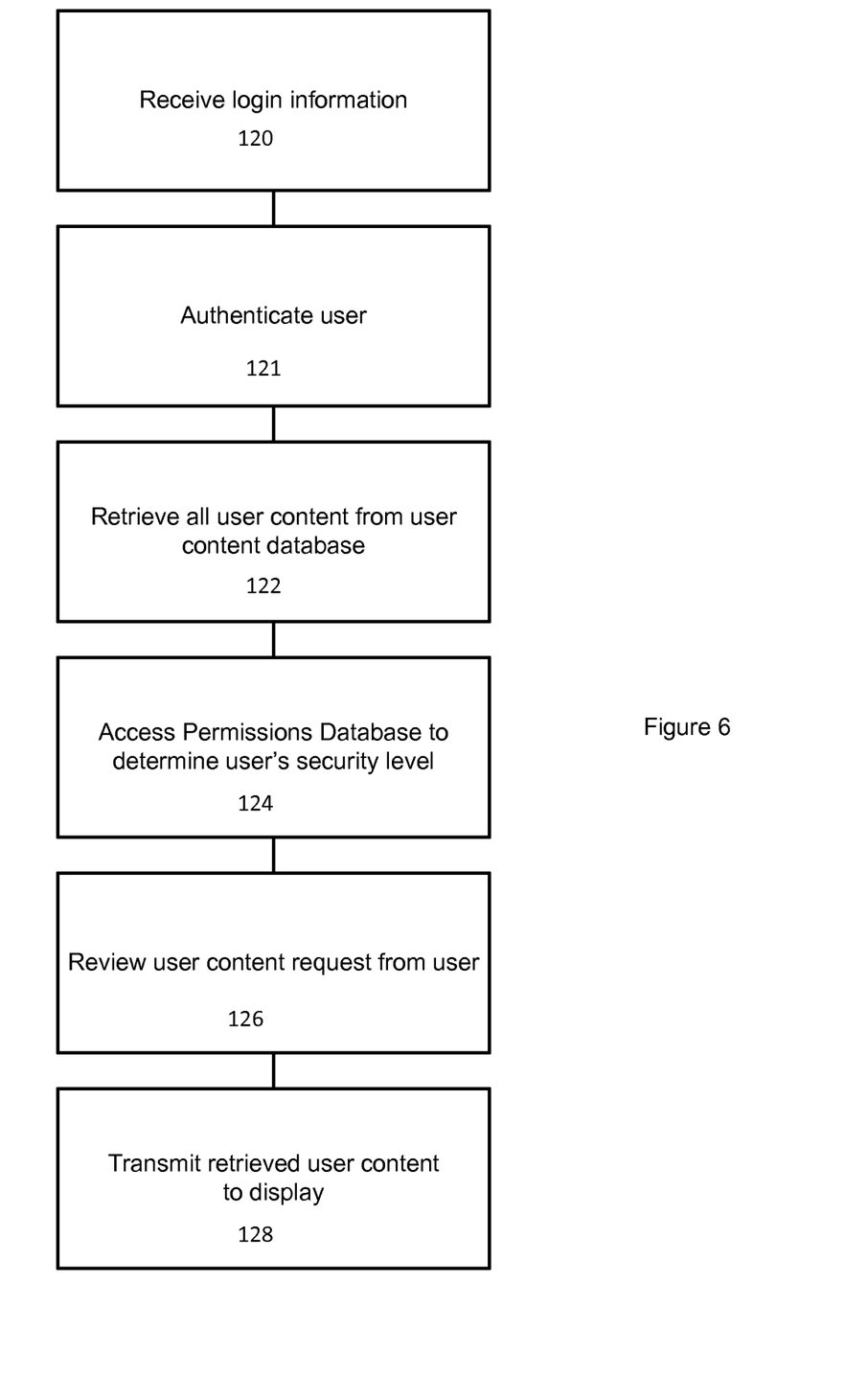
FIG. 6 is a flowchart outlining a third method of retrieving user content in a teaching environment.

In yet a further method, as schematically shown in FIG. 6, after receiving the login information in step 120, the CPU 52 authenticates the user in step 121. For example, the CPU 52 authenticates the user to confirm that the user is authorized to access the user content within the search framework or the search framework itself. After authenticating the user, the CPU 52 retrieves the user content that is stored in the user content database in step 122. For example, the CPU 52 retrieves all the user content that is stored in the user content database. The CPU 52 then determines the user's security level in step 124. For example, the CPU 52 determines the user's level security level by comparing the user login information to a listing or table within the permissions database. In step 126, the CPU 52 reviews the user content request from the user to determine the user content that is being requested for retrieval. In step 128, the CPU transmits the retrieved user content to the display. For example, the CPU 52 then collects, or selects the user content from the entire set of user content which the user is authorized to view and transmits this user content to the display so that the user content may be viewed by the user.

In an alternative embodiment of the disclosure, other criteria which may be used for the authorization determination includes a user's role with respect to a specific relevant OrgUnit, or in other words, for the teaching environment search framework, a user's role with respect to the university, a specific department, a specific course, or the like. A further authorization determination may be the restrictions which have been placed on a specific piece of user content or a specific grouping of similar user content, for instance all quizzes, or all class notes. Another authorization determination may be based on the hierarchy of the object (or user content) within the OrgUnit or within the teaching environment search framework.

In another embodiment, a user may be a student in one course but may be a teaching assistant in another and therefore the user may have different security access to specific user content. When the system is authenticating the user, the processor may determine that the user has different roles within the search framework and therefore, the user content that is made available to the user is determined or controlled by the processor. In other words, an extra check of the user's role within a course or department is performed before the user content that the user is authorized to retrieve is retrieved and transmitted to the user. Therefore, the user cannot use their role as a teaching assistant in one course to gain access to user content associated with a teaching assistant in another course in which the user is a student. Therefore, another criteria to monitor when retrieving user content for the user is the user's role with respect to the OrgUnit that the user content is associated with.

In another embodiment, a user may perform a search for all user content throughout the search framework that the user is authorized to retrieve. This includes determining the user's role with respect to each OrgUnit within the search framework. Each piece of user content may include different authorization rules and therefore, a check is performed against each piece of user content with respect to the user's permissions as determined by the system. For a teaching environment search framework, a test will typically have multiple criteria that have to be met before the user content can be retrieved by a student and therefore, two students may have entirely different user content transmitted for display even if they are both students within the same course.

While the methods have been disclosed with individual steps, the order in which the steps are performed may be interchanged and not necessarily in the order as outlined in FIGS. 4 to 6.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method comprising:
receiving, by one or more processors, from a user, login information associated with a learning environment;
receiving, by one or more processors, from the user, a request to search content associated with the learning environment, wherein the content may comprise a plurality of pieces;
in response to receiving the request to search the content associated with the learning environment,
determining, by one or more processors, an authorization level of the user for each organizational unit under the learning environment;
determining, by one or more processors, all content over the entire learning environment that is viewable to the user based at least in part on the authorization level of the user for each organizational unit, wherein the determining of the content that is viewable to the user includes:
determining, by one or more processors, a role of the user for each organizational unit and comparing the role of the user for each organizational unit with one or more roles respectively associated with the content associated with each organizational unit, wherein the authorization level of the user for each organizational unit is based at least on part on the role of the user for each organizational unit;
determining one or more hierarchies associated with each piece of the content associated with each organizational unit;
checking the authorization level of the user for each organizational unit against each piece of the content associated with each organizational unit and a position of each piece of the content within the one or more hierarchies; and
determining, by one or more processors, one or more release conditions respectively associated with the content of the learning environment, and determining whether a context of the user satisfies the one or more release conditions, wherein the context of the user comprises a time associated with the request to search the content, and wherein the one or more release conditions comprise a start time at which the content is made viewable for the role or organizational unit, and an end time at which the content stops being viewable for the role or organizational unit, wherein all content over the entire learning environment that is viewable to the user comprises one or more of tests, quizzes, notes, exams, and grades associated with the user or a class associated with the user; and providing, by one or more processors, all of the viewable user content over the entire learning environment to the user.

2. The method of claim 1 further comprising:
transmitting, to the user, at least a portion of all of the content that is viewable to the user.

3. The method of claim 1 wherein the determining of all content that is viewable to the user comprises:
retrieving all content from a database; and
selecting content that is viewable to the user from all content.

4. The method of claim 3 wherein the selecting of the content that is viewable to the user comprises:
comparing the authorization level of user with individual settings of content; and
selecting user content which matches the authentication level of the user as content that is viewable to the user.

5. The method of claim 1 wherein the determining of all the content that is viewable to the user comprises:
selecting user content from a database which matches predetermined criteria.

6. The method of claim 5 wherein the predetermined criteria is selected from a group consisting of data restrictions, pre-requisites met and hidden user content.

7. The method of claim 1 wherein the determining of all the content that is viewable to the user comprises:
comparing the authorization level of user with individual settings of all user content in a database;
selecting the user content which matches the authentication level of the user; and
retrieving the selected user content as content that is viewable to the user.

8. The method of claim 1 wherein the determining of the authorization level comprises:
comparing the user with a list of user names and roles;
determining permission of role associated with the user; and
determining authorization level of user based on permission of role.

9. The method of claim 8 wherein the roles are selected from professor, teaching assistant, teacher, dean, or administrator.

10. A system comprising:
a database configured to store user content, the user content relating to a learning-environment; and
a processor configured to receive login information associated with the learning environment from a user, to receive a request to search content associated with the learning environment, wherein the content may comprise a plurality of pieces, to determine an authorization level of the user for each organizational unit under the learning environment, and in response to the request to search the content associated with the learning environment, to determine all content over the entire learning environment that is viewable to the user based at least in part on the authorization level of the user for each organizational unit, and to provide, to the user, all of the content that is viewable to the user,
wherein to determine the content that is viewable to the user includes:
determining a role of the user for each organizational unit and comparing the role of the user for each organizational unit with one or more roles respectively associated with the content associated with each organizational unit, wherein the authorization level of the user for each organizational unit is based at least on part on the role of the user for each organizational unit;
determining one or more hierarchies associated with each piece of the content associated with each organizational unit;
checking the authorization level of the user for each organizational unit against each piece of the content associated with each organizational unit and the position of each piece of the content within the one or more hierarchies; and
determining one or more release conditions respectively associated with the content of the learning environment, and determining whether a context of the user satisfies the one or more release conditions, wherein the context of the user comprises a time associated with the request to search the content, and wherein the one or more release conditions comprise a start time at which the content is made viewable for the role or organizational unit, and an end time at which the content stops being viewable for the role or organizational unit, wherein all content over the entire learning environment that is viewable to the user comprises one or more of tests, quizzes, notes, exams, and grades associated with the user or a class associated with the user.

11. The system of claim 10 further comprising:
a permissions database configured to store a list of user names and associated roles within the learning environment search framework.

12. The system of claim 11 wherein the roles include professor, teaching assistant, teacher, dean, or administrator.

13. The system of claim 11 wherein the permissions database is the same as the database that is configured to store the user content.

14. The system of claim 10 further comprising:
an output interface configured to provide, to the user, all of the content that is viewable to the user.

15. A computer program product comprising a non-transitory computer readable memory storing computer executable instructions thereon that when executed by a computer to perform the method steps of claim 1.

16. The method of claim 1, wherein the determining of all the content that is viewable to the user comprises:
retrieving all user content from a database;
determining whether a user has satisfied a release condition that causes the user content to become content that is viewable to the user.

17. The method of claim 16, wherein the release condition corresponds to satisfaction of a learning objective.

18. The method of claim 17, wherein the learning objective is obtaining a grade on a learning module, the grade satisfying a predefined condition.

19. The method of claim 1, wherein the request to search the content associated with the learning environment comprises a request to search an entire search framework associated with the learning environment.

20. The method of claim 1, wherein the determining all content over the entire learning environment that is viewable to the user is determined further based at least in part on an access level of a authorization level that is higher than the authorization level of the user.

* * * * *